United States Patent [19]
McConnell et al.

[11] Patent Number: 5,594,309
[45] Date of Patent: Jan. 14, 1997

[54] ROBOT CONTROL SCHEME

[75] Inventors: Kenneth G. McConnell, Ames, Iowa; Wan-Shik Jang, Kwang-Ju, Rep. of Korea

[73] Assignee: Iowa State University Research Foundation, Inc., Ames, Iowa

[21] Appl. No.: 260,305

[22] Filed: Jun. 15, 1994

[51] Int. Cl.⁶ .................................................. G05B 19/04
[52] U.S. Cl. ........................... 318/568.22; 318/568.2; 364/474.19; 395/88
[58] Field of Search ............................ 318/632, 573, 318/574, 568.11, 568.12, 568.2, 568.22; 901/2, 14; 364/474.16, 474.19, 474.28, 474.35, 474.12; 395/88, 89

[56] References Cited

U.S. PATENT DOCUMENTS

| | | | |
|---|---|---|---|
| 4,163,184 | 7/1979 | Leenhouts | 318/573 |
| 4,348,623 | 9/1982 | Kobayashi et al. | 318/568.2 |
| 4,396,049 | 8/1983 | Calvert et al. | 364/174 |
| 4,489,377 | 12/1984 | Mawyer et al. | 364/474.2 |
| 4,916,635 | 4/1990 | Singer et al. | |
| 5,237,509 | 8/1993 | Utea et al. | 318/632 |

*Primary Examiner*—John W. Cabeca
*Attorney, Agent, or Firm*—Mueting, Raasch, Gebhardt & Schwappach, P.A.

[57] ABSTRACT

A simple open loop control scheme that minimizes both robot response time and the resulting residual vibration while requiring little computational effort through the intelligent use of conventional servo control technology and the robot's vibration characteristics.

12 Claims, 11 Drawing Sheets

ROBOT CONTROL SCHEME

TECHNICAL FIELD

This invention relates to robotic controls, and more particularly to an open loop robot control scheme.

BACKGROUND ART

Traditionally, robot manipulator arms are modeled as rigid links that are moved through use of controllers, actuators, and sensors. This rigid body concept works quite well in predicting robot behavior provided the robot moves slowly. However, high accelerated motion causes considerable residual vibration to occur after the robot manipulator reaches its defined end point. This residual vibration results from inherent compliance of the robot's structural elements. These structural elements tend to be lightly damped so that any residual vibration requires considerable additional settling time before the robot is considered to have completed its task.

Positioning is a fundamental function of robot manipulators. In order to achieve high speed and accurate positioning, it is necessary to control the robot's vibratory response in a cost effective manner. The faster the motion, the larger the vibration energies that must be controlled so that both the robot's response time and residual vibration are minimized at the same time. A number of methods have been attempted in recent years to improve the robot's response times and to control the residual vibration. These methods are computationally intensive; and hence, are not cost effective.

Those concerned with these and other problems recognize the need for an improved robot control scheme.

DISCLOSURE OF THE INVENTION

The present invention provides a simple open loop control scheme that minimizes both robot response time and the resulting residual vibration while requiring little computational effort through the intelligent use of conventional servo control technology and the robot's vibration characteristics.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

BASIC VIBRATION BEHAVIOR AND THE BASIC CONCEPT

Figure 1:
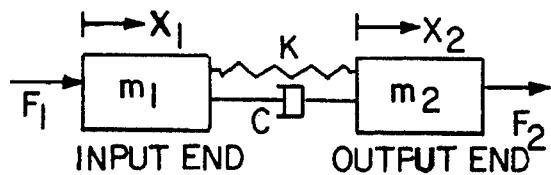
FIG. 1 is a schematic illustrating a simple rectilinear robot structure consisting of two masses ($m_1$ and $m_2$), a spring (k), and a damper (c)

In order to grasp the nature of the control problem, consider two masses ($m_1$ and $m_2$) that are connected by a spring (k) and damper (c) as shown in FIG. 1 to represent a simple model of the robot's moving arm. In this model, motion $x_1$ represents the robot's arm input motion and $x_2$ represents the robot's arm output (or end point) motion. Experience tells us that slowing moving $x_1$ causes $x_2$ to move with essentially the same motion since the acceleration and resulting spring force are very small.

UNDAMPED SMALL MOTION BASIC RESPONSE

In the undamped case, damping value c is zero in FIG. 1. Now we consider what happens when $x_1$ changes suddenly by an amount of $x_0$ (in a step like manner) as shown in FIG.

Figure 2:
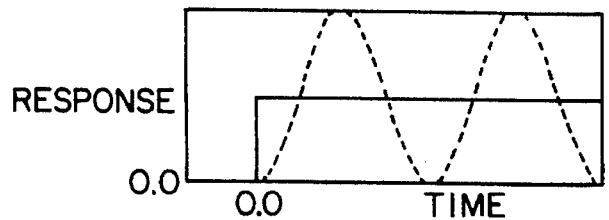
FIG. 2(a) is a graph showing the basic response of an undamped SDOF mechanical system to a single step input, that causes a ringing response.
FIG. 2(b) is a graph showing the basic response of an undamped SDOF mechanical system to a dual step input, timed to produce no ringing.
Figure 2:
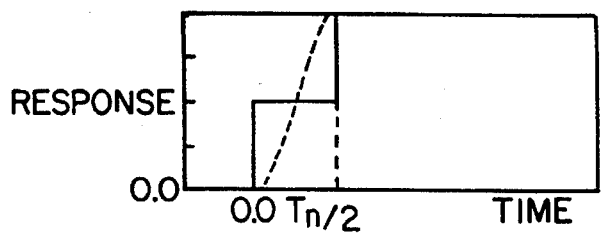

2(a). The corresponding response or end point motion, $x_2$, is given by $$x_2(t) = x_0[1-\cos(\omega t)] \quad (1)$$

where $\omega$ is the system's natural frequency, defined by $\sqrt{k/m_2}$ for this type of motion. This response is shown in FIG. 2(a) where the vibration is seen to continue indefinitely about the input displacement of $x_0$ in the absence of damping. However, an important result is obtained if a second step input (equal in magnitude) is applied when response $x_2$ is at its maximum value; i.e., when $\omega t = \pi$. In this case, the system is in static equilibrium since the second step input makes $x_1 = x_2 = 2x_0$ and no further vibration occurs as is shown in FIG. 2(b). While step inputs require infinite force $F_1$ and cannot be achieved in real systems, a ramp change that occurs within 10% or less of the system's fundamental natural frequency will appear to be essentially a step input as far as the k $m_2$ system is concerned.

This simple example shows two very important ideas for an undamped mechanical system. First, the minimum response time for the robot to move from one point to another is one-half of the natural period of the arm's fundamental natural frequency. Second, the required input to achieve this zero vibration condition consists of two equal step inputs that are properly timed, being one-half natural period apart. This is the basic two-step undamped control method.

UNDAMPED LARGE MOTION SCHEME

A major problem occurs when we have to move over a distance that is much larger than the maximum possible spring deflection, $x_{max}$ $(=x_1-x_2)$, or the required force or torque for the above two step input exceeds the servo controller's output. These problems can be overcome by implementing the following fundamental command scheme. First, apply step input motion $x_0$ that is within the system's capability. Second when $x_2$ reaches point A in FIG. 3, $m_2$ has a velocity $V_0$ that is given by $$V_0 = \omega x_0 \quad (2)$$

Figure 3:
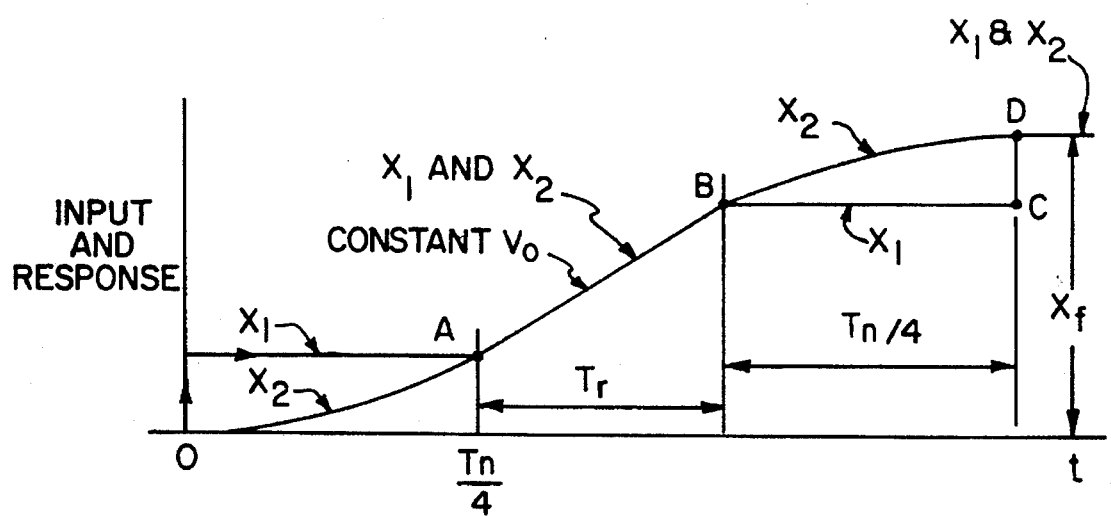
FIG. 3 is a graph showing the ideal response of a SDOF system to a step input followed by a linear ramp at constant velocity $V_0$, and a final step at the end of the cycle, with quarter natural periods at beginning and end.

Now we can keep $m_2$ moving with constant speed $V_0$ if we have input motion $x_1$ move with constant speed $V_0$ as well between points A and B in FIG. 3. This gives a linear displacement time history for both $x_1$ and $x_2$ with no vibration occurring during the linear rise time $T_r$ since the spring remains unstretched during this motion. Third, when point B is reached, the input displacement $x_1$ goes into the third phase where its position $x_1$ remains constant until the peak displacement at D is achieved by $x_2$. At this time (point C), a second step input of $x_0$ is applied to $x_1$ so that the spring is unstressed and no further vibration occurs. This is the undamped dual step with ramp method.

This second example shows that it is possible to break the undamped vibration response into three parts consisting of a first quarter natural period, a linear constant velocity response region, and a second quarter natural period in order to achieve the no residual vibration response in minimum time. This is the fastest time response that can be achieved without residual vibration. The time is given by $$T = \frac{T_n}{2} + \left(\frac{X_f - 2X_0}{V_0}\right) \quad (3)$$

where $x_f$ is the final displacement of $x_2$. Again, note that $x_1$ and $x_2$ move the same total amount so that the coupling spring k remains unstressed due to accelerated motions at the end of the motion. Thus, there is no energy stored in the spring to cause residual vibrations. The problem is how to implement these simple concepts as presented for an ideal undamped robot system to one that has controllers, feedback, damping, and computer controllers.

DAMPED RESPONSE

Damping causes a significant change in the robot's behavior to step or step like (short time duration ramps) inputs since the high velocity of the ramp causes an impulse to be imparted to the output end through the damping mechanism. Hence, one cannot use the simple two step approach outlined above for the undamped case, but must resort to at least one additional intermediate step $\Delta x$ as shown in FIG. 4.

Figure 4:
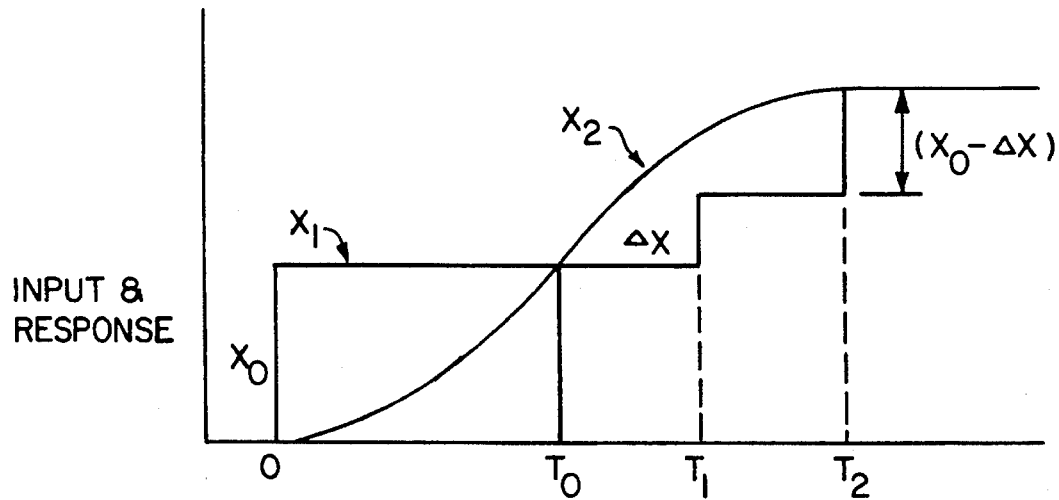
FIG. 4(a) is a graph showing the three step input method to achieve a desired point without vibration when the robot arm has damping, where the graph shows the ideal three step input with damped response.
FIG. 4(b) is a graph similar to FIG. 4(a), but showing the three step input with constant velocity ramp.
Figure 4:
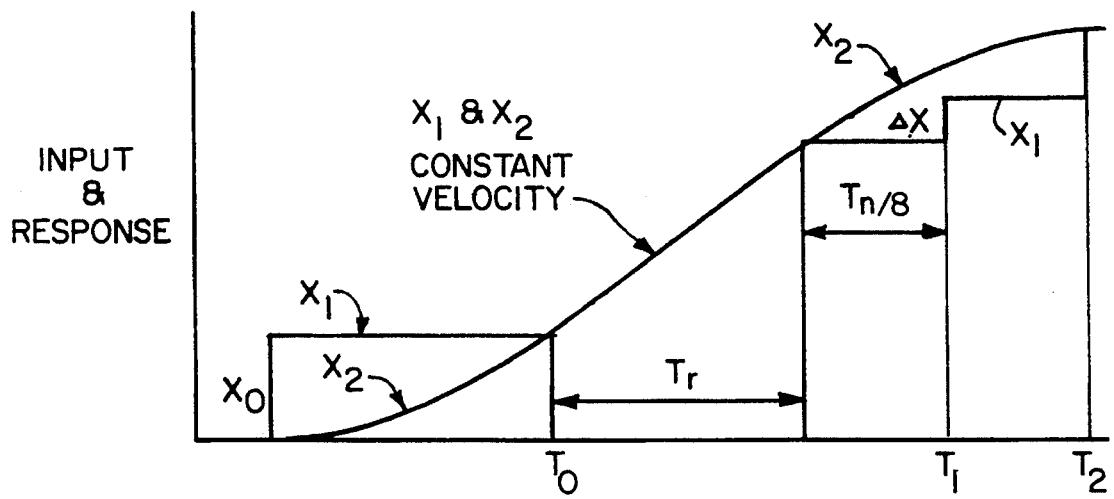

In FIG. 4, the initial step occurs at time zero, the system moves the amount of the step input $x_0$ at time $T_0$, the second small step of $\Delta x$ is applied at time $T_1$, and the final step of magnitude $(x_0-\Delta x)$ is applied at time $T_2$. A rather complicated relationship exists between the size of the intermediate step, the robots velocity, and the damping. However, this complex problem is solved once and the following empirical relationships from curve fitting some complicated responses are obtained. These relationships assume that the system responds basically as a single degree of freedom system with dimensionless damping $\zeta$ and that the second step command is applied at time $T_1$ $(=3T_n/8)$ after the first step input. This second step input has a magnitude of $\Delta\Delta x$ that is given by $$\frac{\Delta x}{x_0} = \begin{cases} \ln(1+10.1\zeta - 33.8\zeta^2) & 0 < \zeta < 0.11 \\ 0.772 + 0.2\ln(\zeta) & 0.11 < \zeta < 0.25 \end{cases} \quad (4)$$

while the final input step of $(x_0-\Delta x)$ is applied at a time $T_2$ given by $$\frac{T_2}{T_n} = \begin{cases} 0.501 + 1.145\zeta & 0 < \zeta < 0.11 \\ 0.534 + 0.850\zeta & 0.11 < \zeta < 0.25 \end{cases} \quad (5)$$

Since a number of decisions need to be made dependent on the robot's dynamic characteristics, the time corresponding to $T_n/4$ is measured as the output end achieves the designated input step displacement that corresponds to $x_0$. The robot's actual damping can be estimated in an iterative manner from the measured time $T_0$ and the velocity at time $T_0$. Knowing this damping and time period, it is then possible to estimate the size of the second small input step that is to occur at $3T_n/8$ (so the computer has $T_n/8$ seconds in which to make all necessary decisions). Any convenient time delay can be used here but is limited to being significantly less than $T_n/4$. The reason for the limits on this time delay is that the extra velocity that is imparted to the output end must have time to ensure that the end will make the desired displacement while the residual vibration is absent. This method is the basic three step method. As illustrated in FIG. 4(b), this method can be combined with the linear ramp (constant velocity) method outlined with respect to FIG. 3. The only change is that an intermediate step of amount $\Delta x$ is applied at time $T_1$ $(T_0+T_r+T_0/8)$ (point D). The last step of $x_{FINAL}-(x_0-\Delta x)$ at C is applied at time $T_2$.

GENERAL ROBOT MODEL

The robot has major mechanical and electrical components. These two components are modeled separately and then combined for the system.

MECHANICAL MODEL

Figure 5:
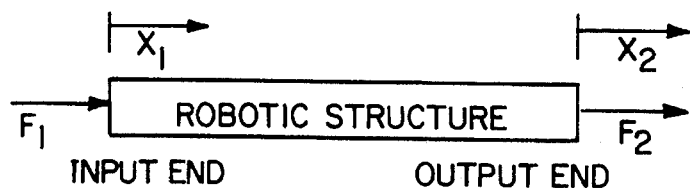
FIG. 5 is a schematic illustrating a robotic structure showing input and output ends.

A robot's structure can be modeled in terms of either dynamic stiffness $K_{ij}$ (the force at location i due to a displacement at location j) or receptance functions $H_{ij}$ (displacement at location i due to a force applied at location j) by considering the robot's arm as a freely moving body in the direction of robot motion as shown in FIG. 5. It is noted that these are transfer functions and are functions of the LaPlace operator s. For this discussion the robot's input end is location (1) while the robot's output end is location (2) as shown in FIG. 5. The corresponding input-output relationships can be written as $$K_{11} x_1 + K_{12} x_2 = F_1$$

$$K_{21} x_1 + K_{22} x_2 = F_2 \qquad (6)$$

where $K_{11}$ is the robot's input dynamic stiffness.

$K_{12} = K_{21}$ is the robot's transfer dynamic stiffness between input and output.

$K_{22}$ is the robot's output dynamic stiffness.

$x_1$ and $x_2$ can be either linear or angular displacements.

$F_1$ and $F_2$ can be either forces or moments.

$K_{pq} = k_{pq} + c_{pq}s + m_{pq}s^2$ is composed of stiffness damping, and inertia terms.

solving Eqs. (6) for the displacements give $$x_1 = H_{11} F_1 + H_{12} F_2$$

$$x_2 = H_{21} F_1 + H_{22} F_2 \qquad (7)$$

where $H_{11}$ is the driving point receptance.

$H_{12} = H_{21}$ is the transfer receptance between input and output.

$H_{22}$ is the output receptance.

The dynamic stiffness $K_{pq}$ and receptance $H_{pq}$ are related by $$H_{11} = \frac{K_{22}}{\Delta} \qquad (8)$$

$$H_{12} = \frac{-K_{12}}{\Delta} = H_{21} = \frac{-K_{21}}{\Delta}$$

$$H_{22} = \frac{K_{11}}{\Delta}$$

$$\Delta = K_{11} K_{22} - K_{12} K_{21}$$

When determinant $\Delta$ is zero, we have the eigenvalues (natural frequencies) of the robot's structure in free space (no external forces in the direction of robot motion).

CONTROLLER MODEL

A conventional controller model is implemented in this scheme. This means that the force (torque) generated by the servo motor (actuator) is proportional To the current passing through its armature. In addition, a back emf is generated that is proportional to the robot's input velocity, $\dot{x}_1$, so that the input force $F_1$ becomes $$F_1 = GK_1 E - K_2 \dot{x}_1 \qquad (9)$$

where G is the servo system's forward gain, $K_1$ is the force (or torque) constant of the servo motor (Linear or torque type)

$K_2$ is the back emf term dependent on the robot's input motion response $x_1$.

E is the input error that is given by $$E = x_{in} - x_1 \qquad (10)$$

$x_{in}$ is the input command function.

ROBOT SYSTEM MODEL

Now, if Eqs. (7), (9), and (10) are combined when $F_2=0$, we obtain the equations of motion for a servo controlled robot arm in terms of the robot's receptance as $$x_1 = H_{11}[GK_1(x_{in} - x_1) - K_2 \dot{x}_1] \qquad (11)$$

$$x_2 = \frac{H_{21}}{H_{11}} x_1$$

$$F_2 = 0$$

Figure 6:
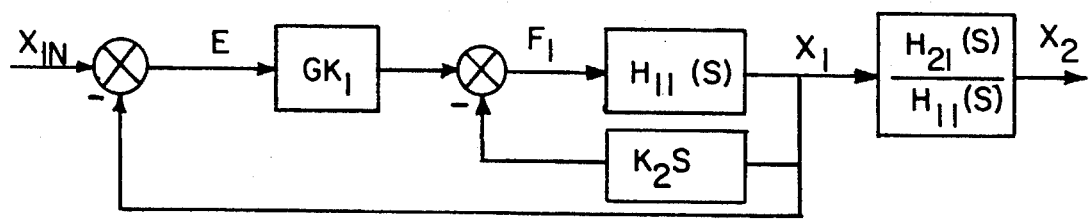
FIG. 6 is a schematic block diagram of the servo controller and robot structural characteristics.

Equation (11) allows us to construct the servo's block diagram as shown in FIG. 6.

Figure 7:
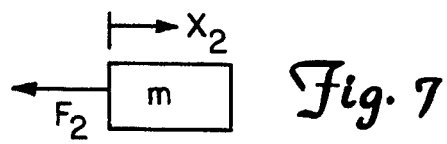
FIG. 7 is a schematic free body diagram of a mass attached to the output end of a robot structure.

Effects of robot picking up an object of mass m:

When a robot is used to pick up an object with mass (or inertia) m, the robot's dynamic characteristics are modified. This modification can be easily obtained from the free body diagram shown in FIG. 7. The force on mass m is $F_2$ and is given by $$F_2 = -m\ddot{x}_2 = -ms^2 x_2 \qquad (12)$$

Substitution of Eq. (12) into the above equations changes the robot's receptance free response functions to $$H_{11}^* = \frac{H_{11} + (H_{22}H_{11} - H_{12}H_{21})ms^2}{1 + H_{22}ms^2} \qquad (13)$$

$$H_{12}^* = H_{21}^* = \frac{H_{21}}{1 + H_{22}ms^2}$$

Equation (13) clearly shows the effects of the object's mass on the robot arm's dynamic performance. Any control scheme must be able to sense the effects of this inertia change on the robot's structural behavior. Now we see the servo controlled robot arm is governed by Eq. (11) when the $H_{pq}$ terms are replaced by the $H^*_{pq}$ terms. Thus, Eq. (11) becomes $$x_1 = H_{11}^* [GK_1(x_{in} - x_1) - K_2 \dot{x}_1] \qquad (14)$$

$$x_2 = \frac{H_{21}^*}{H_{11}^*} x_1$$

where $H^*_{pq}$ contain effects of end mass m on system characteristics. The form of Eqs. (11) and (14) are the same. Thus, Equation (14) clearly shows that the block diagram's form is not changed by the robot picking up additional inertia in the form of mass as in this example. Thus, the $H^*_{11}$ can replace $H_{11}$ and $H^*_{21}$ can replace $H_{21}$ in FIG. 6.

THE OPEN LOOP COMPUTER CONTROLLER

The computer is to be used in an open loop concept where it monitors the robot's response to a step input and concludes from that response what the robot's dynamic characteristics are for any mass m being picked up so that appropriate commands can be applied at the correct time to bring the robot to a complete stop at the desired end point. This adjustment to changes in fundamental natural frequency (measured period $T_0 \cong T_n/4$) make the controller extremely robust.

Figure 8:
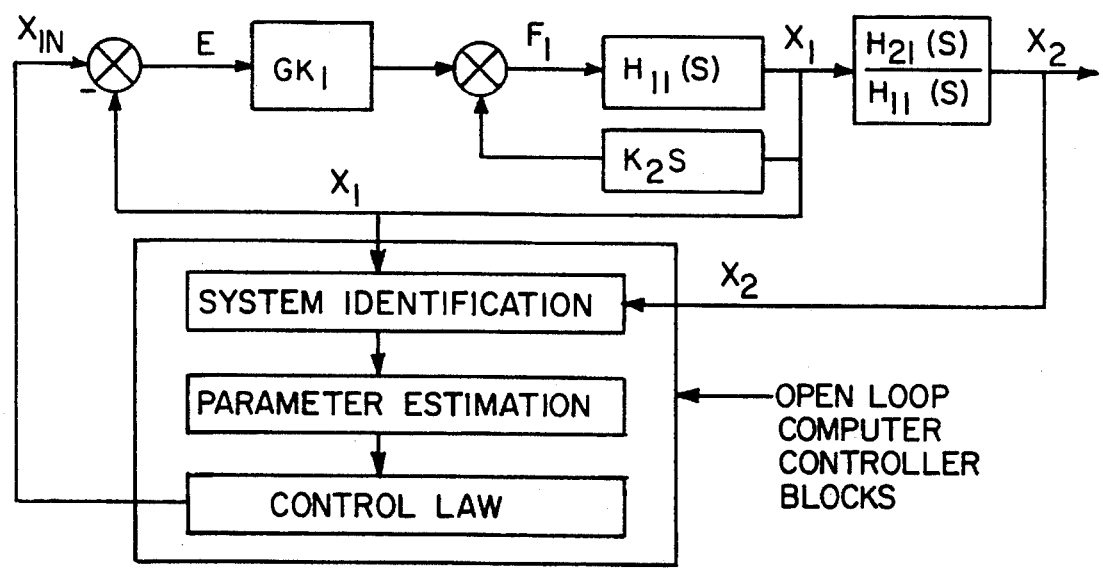
FIG. 8 is a schematic block diagram of the servo controller and robot structural characteristics with open loop computer controller elements.

FIG. 8 shows the block diagram with the computer open loop controller elements connected. The computer controller is represented by three blocks. The first block takes in robot response information such as $x_1$ and $x_2$ or an appropriate force signal from the robot structure. This information is used to monitor the robot's response to the first step input command. This response information is used to identify the system's (both robot structure and servo controller) dynamic characteristics. Once these characteristics are known, the system is identified so the first computer function block is called *System Identification*.

Once the system characteristics are identified, we can then use either a look up table or equations 4 and 5 to estimate the times and magnitudes of the next two commands to the controller's input; i.e., $x_{in}$. Then, the last two steps of the three step control law are applied to the conventional servo's input at the appropriate times. Before the three step control law is implemented, a fundamental decision is required as to whether the required total motion can be achieved through a single three step process as shown in FIG. 4(a) or the three step process with a ramp as shown in FIG. 4(b). These choices are made based on $X_{FINAL}$ AND $x_{max}$ where $X_{FINAL}$ is the required final displacement and $x_{max}$ is the maximum motion consistent with torque motor limits or structural stress limits.

THREE STEP CONTROL LAW FOR SMALL MOTION

If $x_{FINAL} \leq x_{max}$, then the three step control law for small motion is shown in FIG. 4(a). This control law has three step inputs determined by the following method:

1. Apply a step input that corresponds to half of the distance the robot is to move, $x_0 = x_{FINAL}/2$;
2. Measure the time, $T_0$ it takes the system to achieve this half distance. This time corresponds to approximately one-fourth of the system's natural period, $T_n$. (The reason this is approximately the quarter period is due to the fact that the system is responding with its damped natural frequency instead of its undamped natural frequency.);
3. Measure the system's velocity, $V_0$, as the half distance travel has occurred;
4. With this information, estimate the system's damping and calculate how large the second step input needs to be in order to overcome the robot's damping behavior;
5. Issue the second step input command at the appropriate time, $T_1$; and
6. Issue the third step input command at the appropriate time, $T_2$.

Figure 9A:
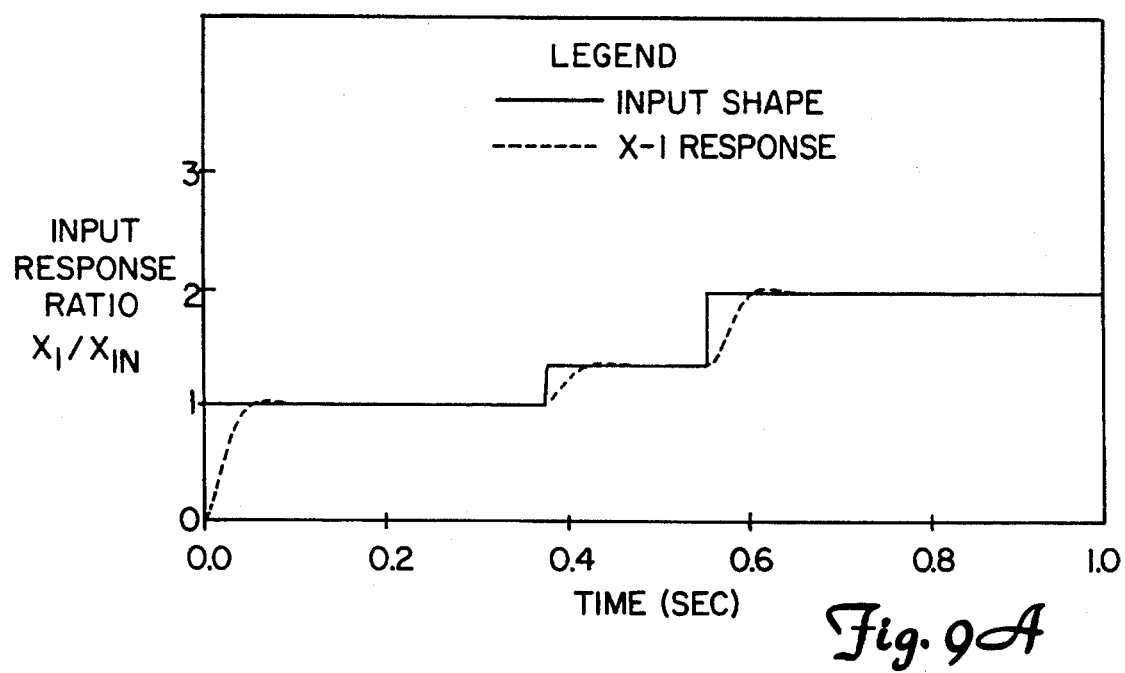
FIG. 9(a) is a graph showing three dimensionless step commands and the input motion response ratio $x_1/x_{in}$, when n=10.
Figure 9B:
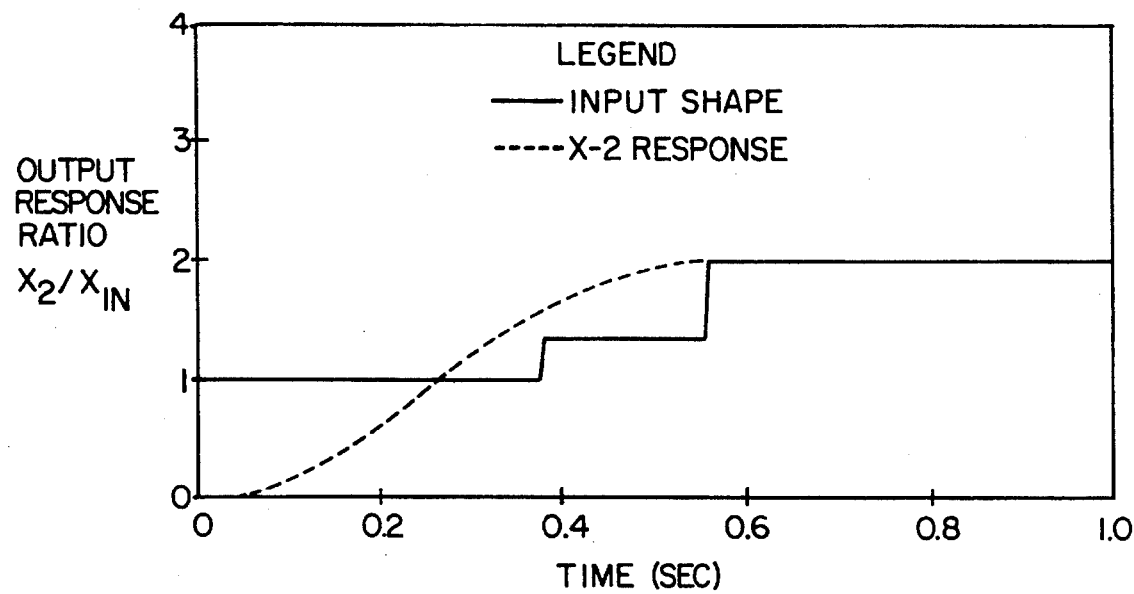
FIG. 9(b) is a graph showing three dimensionless input step commands and the output motion response ratio $x_2/x_{in}$, when n=10.
Figure 10A:
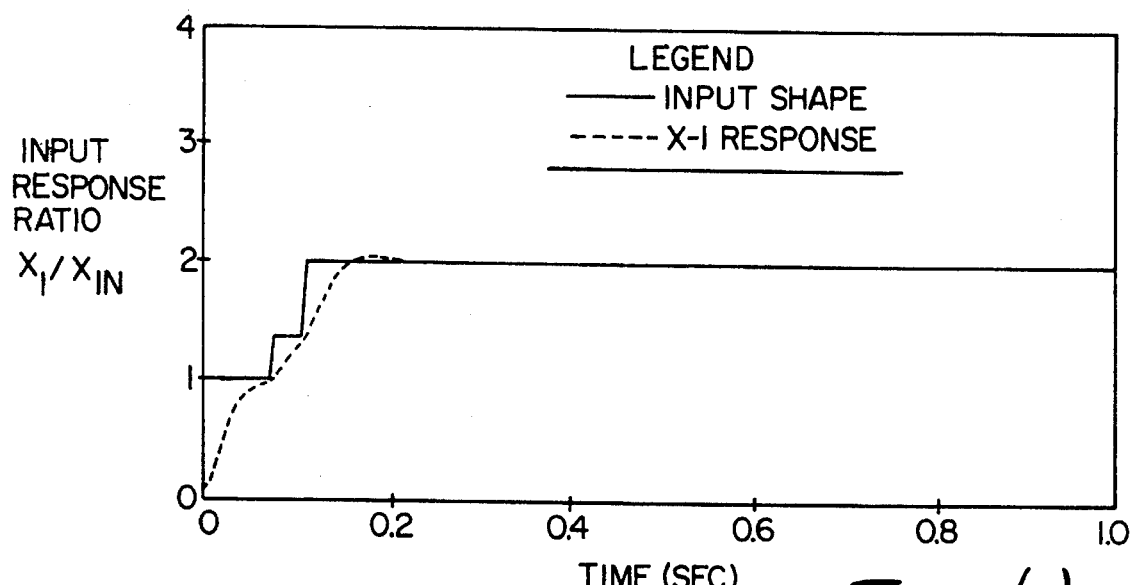
FIG. 10(a) is a graph showing three dimensionless step commands and the input motion response ratio $x_1/x_{in}$, when n=2.
Figure 10B:
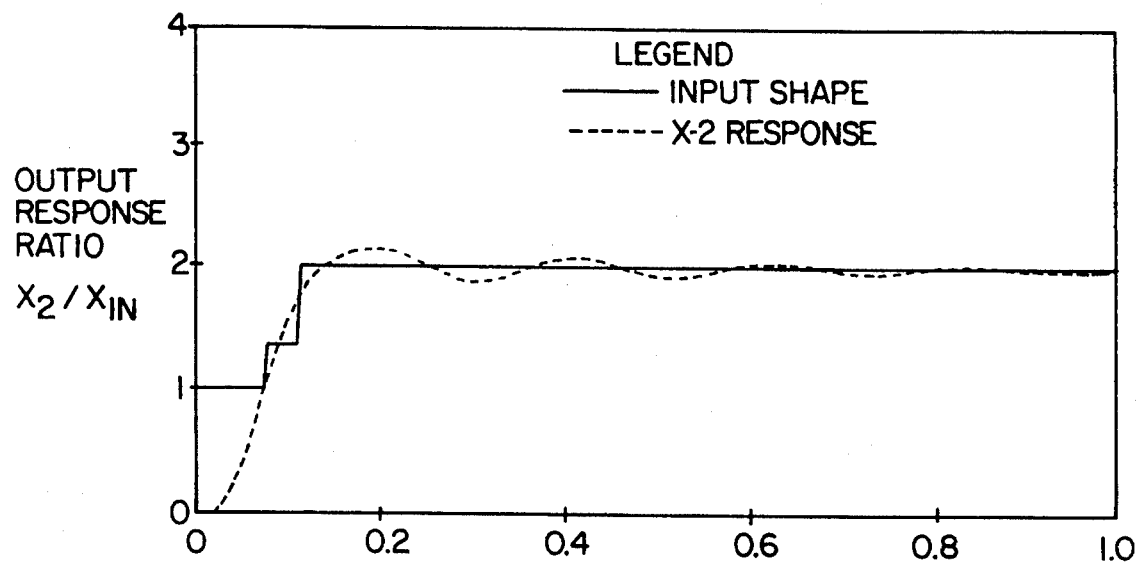
FIG. 10(b) is a graph showing three dimensionless step commands and the output motion response ration $x_2/x_{in}$, when n=2.

The success of this control scheme is illustrated in FIG. 9 where the input commands and the input response $x_1$ and output response $x_2$ are shown. It is clear that the input response $x_1$ is not a true step input. However, it is close enough to being a step that output $x_2$ behaves as though it is a step input. The ratio of servo controller natural frequency to the robot's arm natural frequency is 10 in this case. The curves in FIG. 10 are for this ratio being 2. It is obvious that the input does not respond fast enough to look like a step input and the control method is unsatisfactory. It appears that the frequency ratio ($\omega_{controller}/\omega_n$) must be greater than 5 for this method to work.

THREE STEP CONTROL LAW FOR LARGE MOTION

If $x_{FINAL} > x_{max}$, then the three step control law for large motion is shown in FIG. 4(b).

This control law has three step inputs determined by the following method:

1. Analyze the total distance traveled ($x_{FINAL}$) so that the constant velocity displacement is known and the linear rise time ($T_r$) can be estimated;
2. Apply the first step input with maximum amplitude $x_0 = x_{max}/2$ so that the highest constant velocity $V_0$ is achieved.
3. Measure time $T_0$, the time it takes the system to achieve distance $x_0$. This is time that corresponds to approximately one-fourth of the system's natural period, $T_n$. (The reason this is approximately the quarter period is due to the fact that the system is responding with its damped natural frequency instead of its undamped natural frequency.);
4. Measure the system's velocity, $V_0$, as the $x_0$ distance has occurred so that $T_r$ can be calculated; and
5. With this information, the actual constant velocity is known so that the linear input commands can be issued.
6. At time $T_0 + T_r$, the input command requires motion $X_1$, to remain constant until time $T_1$ where the second step input $\Delta x$ is applied as shown in FIG. 4b.
7. At time $T_2$, the final input command of $X_{FINAL} - (X_0 - \Delta x)$ is applied at point C as shown in FIG. 4b.

METHOD TO INCORPORATE STEP CONTROL OF ROBOTS WITH OPERATOR INPUT TO ACHIEVE FASTEST RESPONSE TIME WITHOUT RESIDUAL VIBRATION

OBJECTIVE: To use the three step (or modified 2, 4, 6, or more step sequence) control scheme to achieve the fastest robot response time without residual vibration when an operator closes the control loop by giving the commands to position the robot.

SYSTEM DEFINITIONS

Figure 11A:
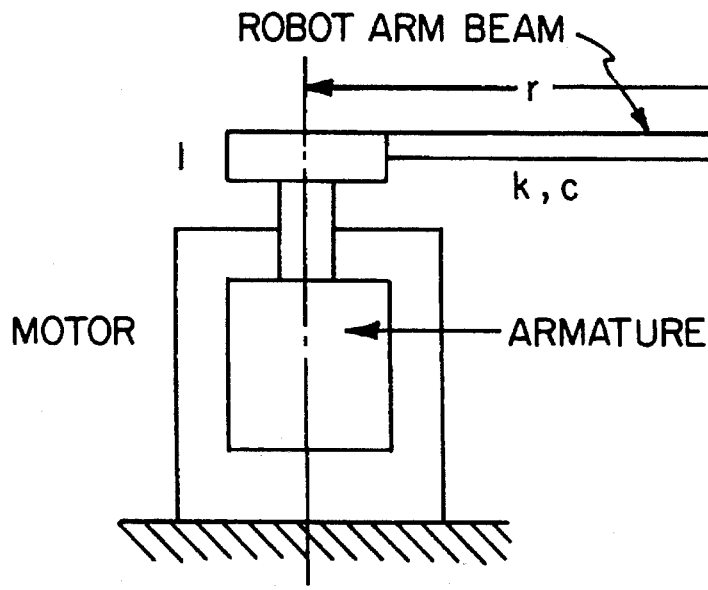
FIG. 11(a) is a side elevational view of a simple robot arm attached to a motor with mass m at its free end, stiffness k, and damping c.
Figure 11B:
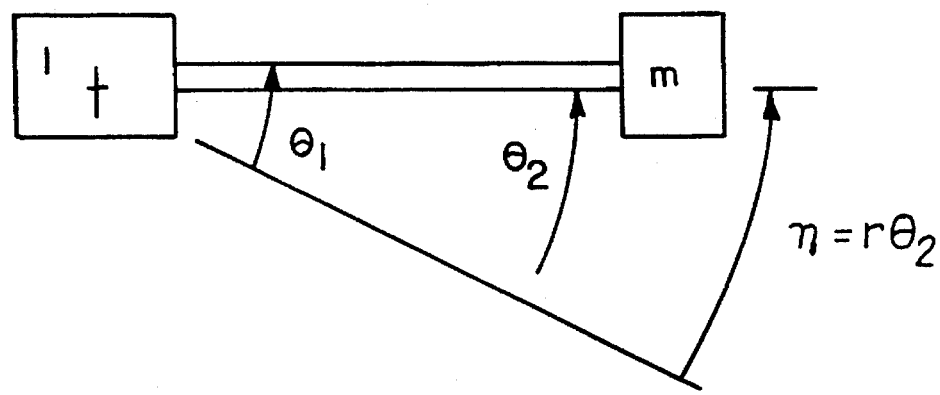
FIG. 11(b) is a top plan view thereof.

FIG. 11 shows the general layout of a simple single arm robot. The motor with moving armature and robot arm base have a lumped inertia I. The robot arm is shown as a simple beam with stiffness k and damping c. A variable mass m is attached at the beam's free end. The position of mass m can be given by the curvilinear coordinate η or by angle $\theta_2$ while the position of the arm's base is given by angle $\theta_1$.

Figure 12:
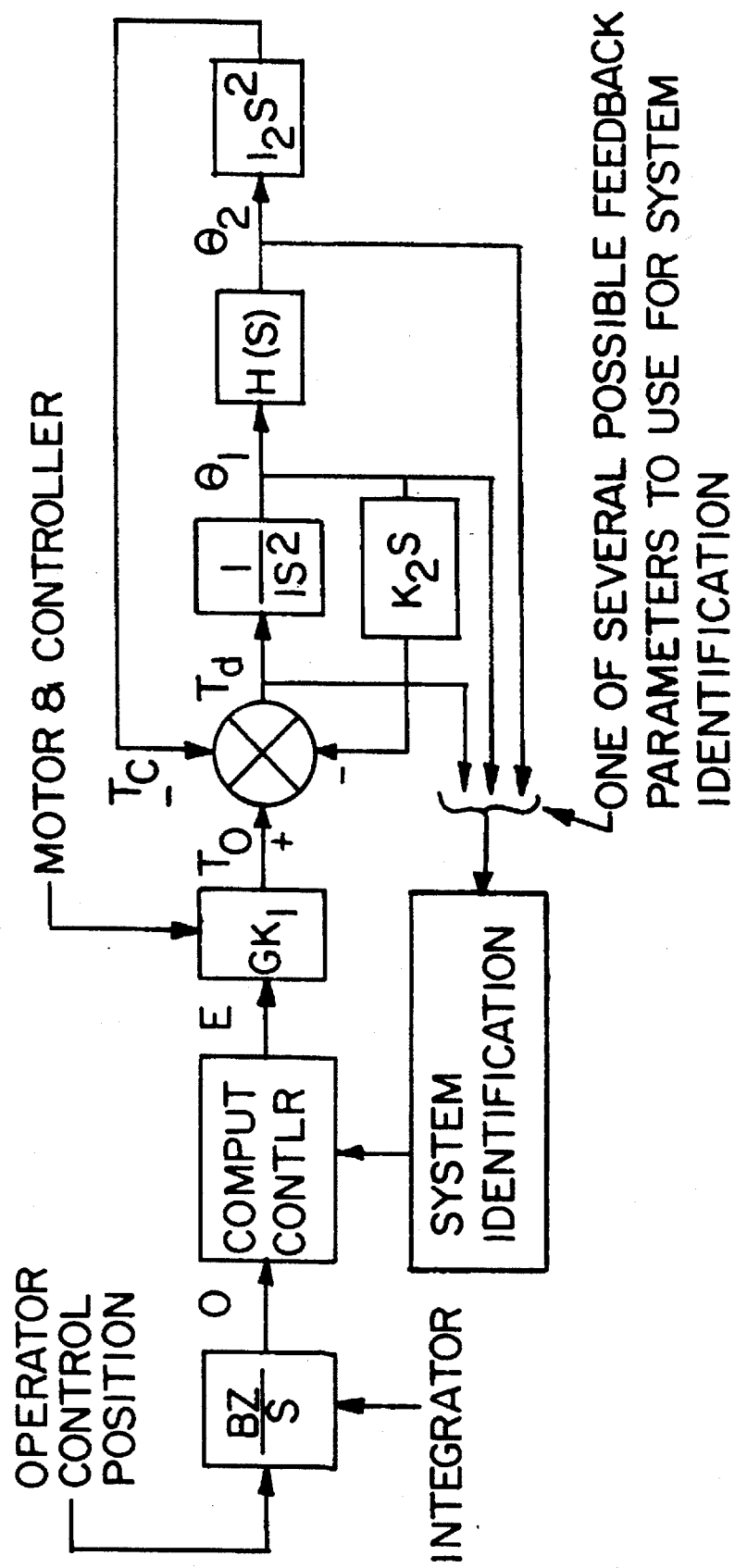
FIG. 12 is a schematic block diagram of a rapid response control system utilizing the step command concept in conjunction with operator input.

FIG. 12 shows the basic elements in the controller scheme. These elements are intended to be generic (or typical) but not any specific requirement to this disclosure.

The main elements of such a control system are shown in FIG. 12. These elements are defined here.

1. Operator control position. This is a device that generates a voltage that is proportion to its position by a device like a potentiometer. Thus, the input voltage to the integrator is given by $$V = Bz \quad (15)$$

2. The integrator integrates the control position voltage given by Eq.(15) to generate a voltage that is proportional to the desired angular position, θ.

This integration process is limited to be within the capacity of the elecro-mechanical system to respond; for example 4.0/T for the two step, 5.33/T for the four step method, 6.32/T for the six step method, etc. where T is the longest fundamental natural vibration period of the machine under control.

3. The computer controller reads the desired position θ at specific times as will be defined in regard to FIG. 13 as well as the system identification information. Based on this information, the computer controller issues step output voltages to the drive motor controller using either the 3-step method or other suitable set of step inputs that generate rapid response without residual vibration. The meaning of this statement will become clearer in the discussion that goes with FIG. 13.

4. The motor and controller are modeled as gain G for the controller and motor constant $K_1$ for the forward loop so that the output torque (or force) is given by $$T_o = G K_1 E \qquad (16)$$

This forward loop output torque is modified by the motor velocity feedback torque $K_2 s$ where $K_2$ is the motor feedback constant and s is the LaPlace operator. This motor output torque is also reduced by the torque required to accelerate the machine's output end. The net torque $T_d$ is available to accelerate the machine system is given by $$T_d = T_o - K_2 s \theta_1 - T_c \qquad (17)$$

5. The net torque $T_d$ is available to accelerate the motor's and robot's base inertia I. The output motion is the base motion $\theta_1$. This angle becomes input angle $\theta_1$ at the robot arm's base. This motion is fed back to reduce the effectiveness of the input torque and becomes the input to the robot arm's position transfer function H(s).

6. The robot's transfer function H(s) can be expressed in terms of the simple system as, $$H(s) = \frac{k + cs}{I_2 s^2 + cs + k} \qquad (18)$$

where k is the effective first mode spring constant, c is the first mode damping, and $I_2$ is the effective inertia of the output side of the robot arm. The output side is the desired motion 74 $_2$. The robot arm's fundamental natural frequency occurs at $\sqrt{k/I_2}$.

7. $\eta_2$ or the curvilinear coordinate $\eta$ is the desired output motion.

8. The output motion $\theta_2$ is the source of generating an inertial feedback torque $T_c$ that is given by $$T_c = I_2 s^2 \theta_2 \qquad (19)$$

This feedback torque reduces the torque available to accelerate the base inertia I.

9. The system identification is required to inform the controller about the robot's dynamic characteristics. Variables such as $T_d$, $\theta_1$ or $\theta_2$ (or other appropriate system variables such as motor current or robot arm strain) can be used as input information. This system identification information is then used by the digital controller.

HOW THIS CONTROL LOOP WORKS

For purposes of this discussion, several assumptions are made. First, it is assumed that the operator put the controller in the maximum position so the system is put into a limiting (worst case) operating case. Second, it is assumed that any suitable step command scheme can be used which ends up with no residual vibration. This step command scheme is then applied as per this discussion. The undamped two step command scheme is illustrated in order to keep FIG. 13 and the discussion as simple as possible. Third, it is assumed that at time t =0, the operator started the sequence so that the largest demand is made immediately during the first step cycle.

Figure 13:
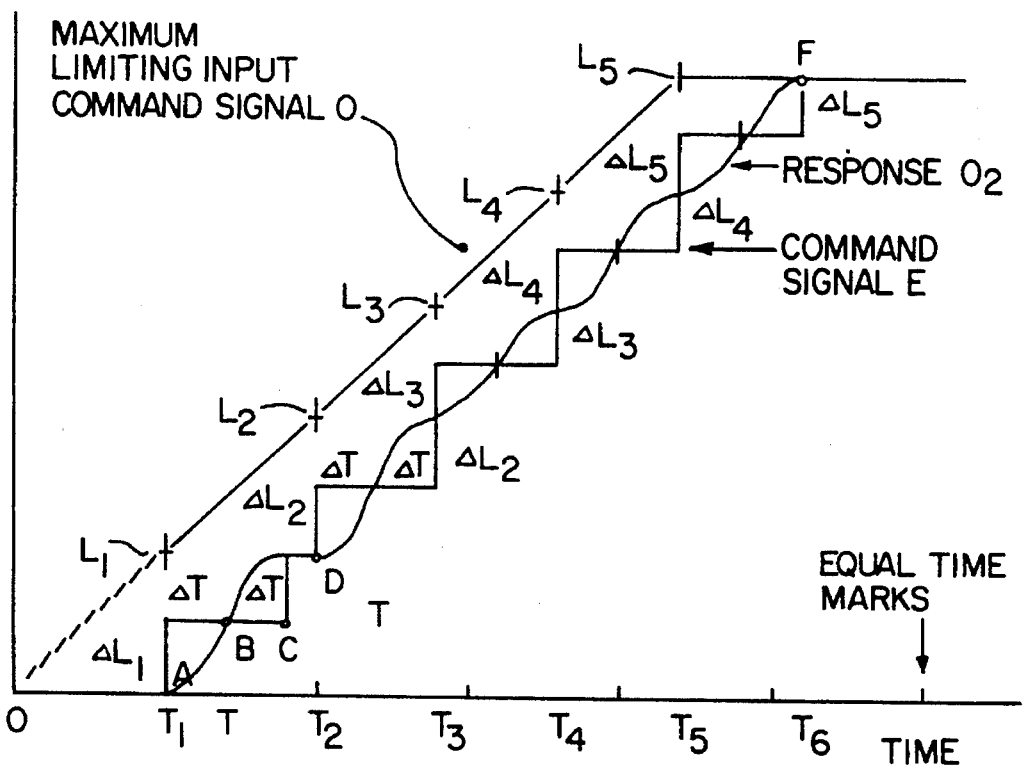
FIG. 13 is a graph showing input, command, and response signals for an operator controlled system under worst case conditions.

FIG. 13 shows the resulting operator generated command position θ, the controller commands E, and the output response $\theta_2$ as a function to time t. The computer samples the operator command function at an adjustable rate that depends on the system's dynamic response. The first sample $L_1$ always starts with the longest natural frequency period of the robot when mass m is the largest permissible value, a value that is automatically set after the passage of several periods with no operator activity. Thus, the time tick marks are separated by this largest period $T_1$.

The operator generates the limiting maximum command request by pushing the control lever to the full position at time t=0. This generates a desired command line that is the limiting case shown. At time $T_1$ the computer discovers that the robot is to be at position level $L_1$ so it issues the first step command of amplitude $\Delta L_1 = L_1/2$ at point A. At time T' (point B), the system identification has determined that the desired response of amplitude $\Delta L_1$ has occurred and notes that the response is faster than assumed (since m is smaller than the maximum value) and has a value of $\Delta T$. Thus, it adjusts the time to apply the second step at point C. Now the controller must wait for time $T_2$ to occur to take the next sample. This is the last time the controller will have to wait for it now adjusts the sample interval to be twice $\Delta T$ so that the next sample time becomes $$T_3 = T_2 + 2\Delta T \qquad (20)$$

which is less than 3 $T_1$ since $\Delta T$ is smaller than original value of $T_1$. In this way a variable sample time is available to make the system run more efficiently.

At time $T_2$ the next input level of $L_2$ is observed and an appropriate step input that is given by $$\Delta L_2 = (L_2 - L_1)/2 \qquad (21)$$

is applied at point D. The system detects that the response achieves this new level at time T" which is $\Delta T$ seconds after point D.

At time $T_3$, the new level of $L_3$ is measured, the second step of level $\Delta L_2$ is applied, and the new input step of $\Delta L_3$ is applied. This process continues until time $T_5$ where the operator stops the input. At this point the response is behind one response time of 2 $\Delta T$. The desired end point is achieve at time $T_6$ at point F. It is clearly evident that the ability to adjust the sample time makes the achievement of Point F occur somewhat sooner; thus, speeding up system response. Otherwise, point F would be attained at a latter time.

The advantages of this control scheme over other methods are:

1. The system response time is at least two times faster with the two step input and more than two times with the four or six step inputs.
2. The system is open loop adaptive in that the control strategy changes the system control time so that optimum response occurs. The system is very robust.
3. Other systems require extensive computations to achieve these results and should lag the input further than this multi-step method.
4. The operator should not be able to observe the lagging of the control system in this case since we are talking one half of a natural vibration period which is usually quite small.

SUPER FAST ROBOT CONTROL

OBJECTIVE: To increase speed of robot response in moving from one point to another.

Figure 14:
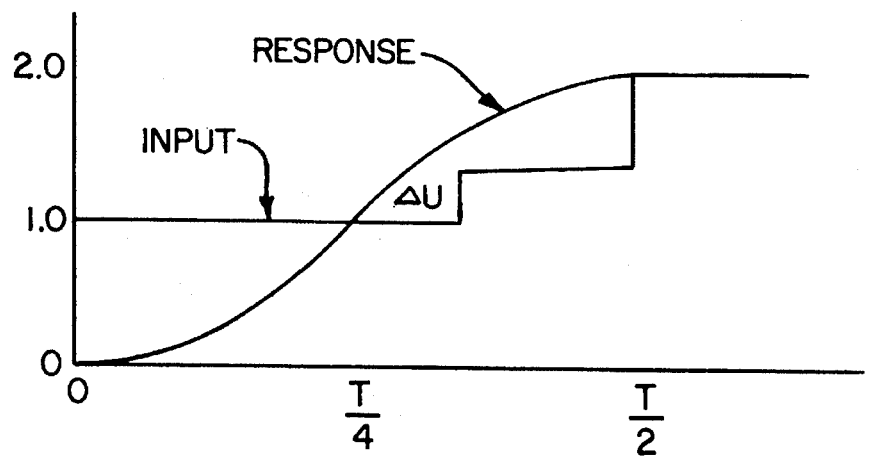
FIG. 14 is a graph showing three step inputs.
Figure 15:
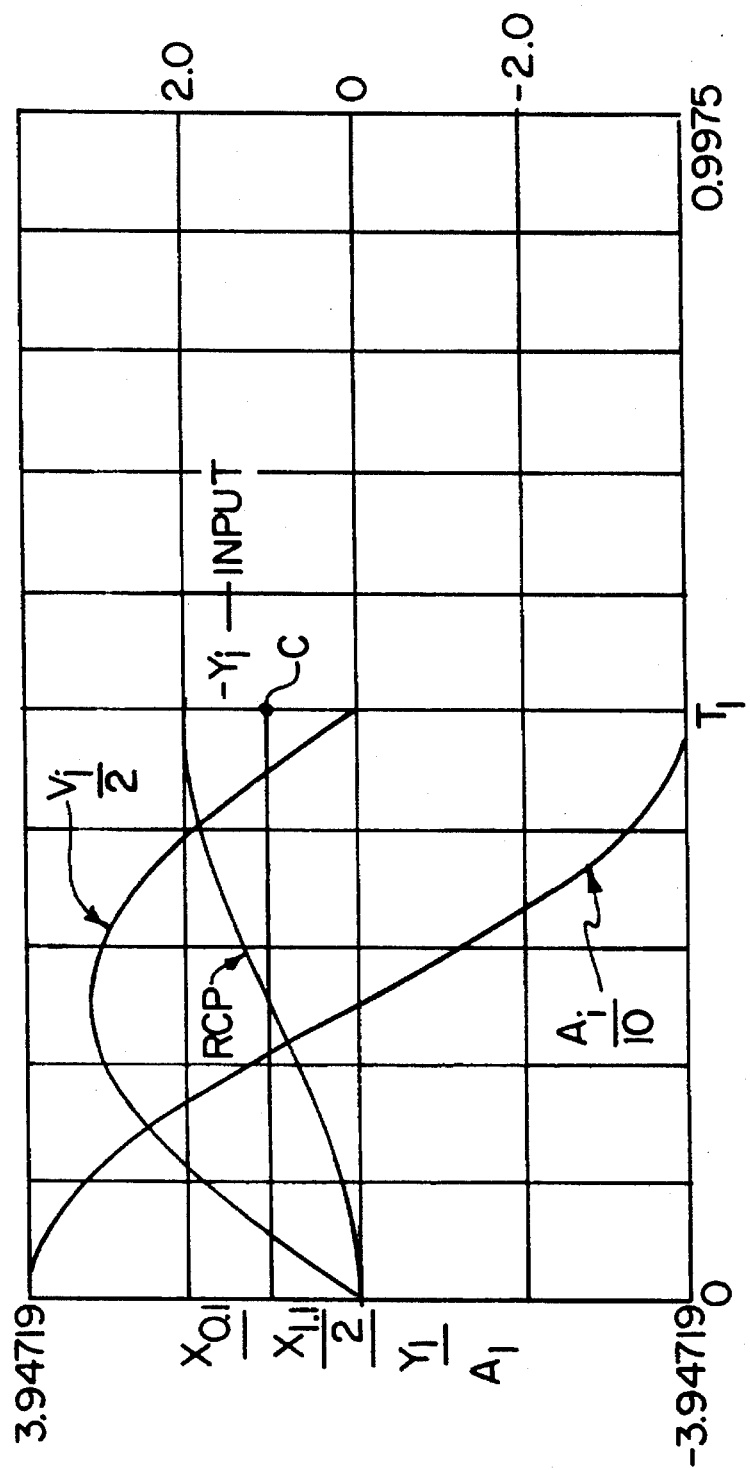
FIG. 15 is a graph showing input-output displacement, velocity and acceleration for the undamped two step method.

The three step method achieves a rapid response of a simple robot to accomplish rapid response without residual vibration by using three individual steps as shown in FIG. 14. The small intermediate step is required to account for the effects of damping. The undamped 2 step case is shown in FIG. 15. It is clear that a total displacement of 2.0 units of A is achieved in 0.5 T seconds where T is the robot's fundamental natural period. The maximum velocity is 6.28 A $f_n$ where A is the amplitude of the step and $f_n$ is the robot's fundamental frequency (1/T). The maximum acceleration is 39.4 A $f_n^2$.

Figure 16:
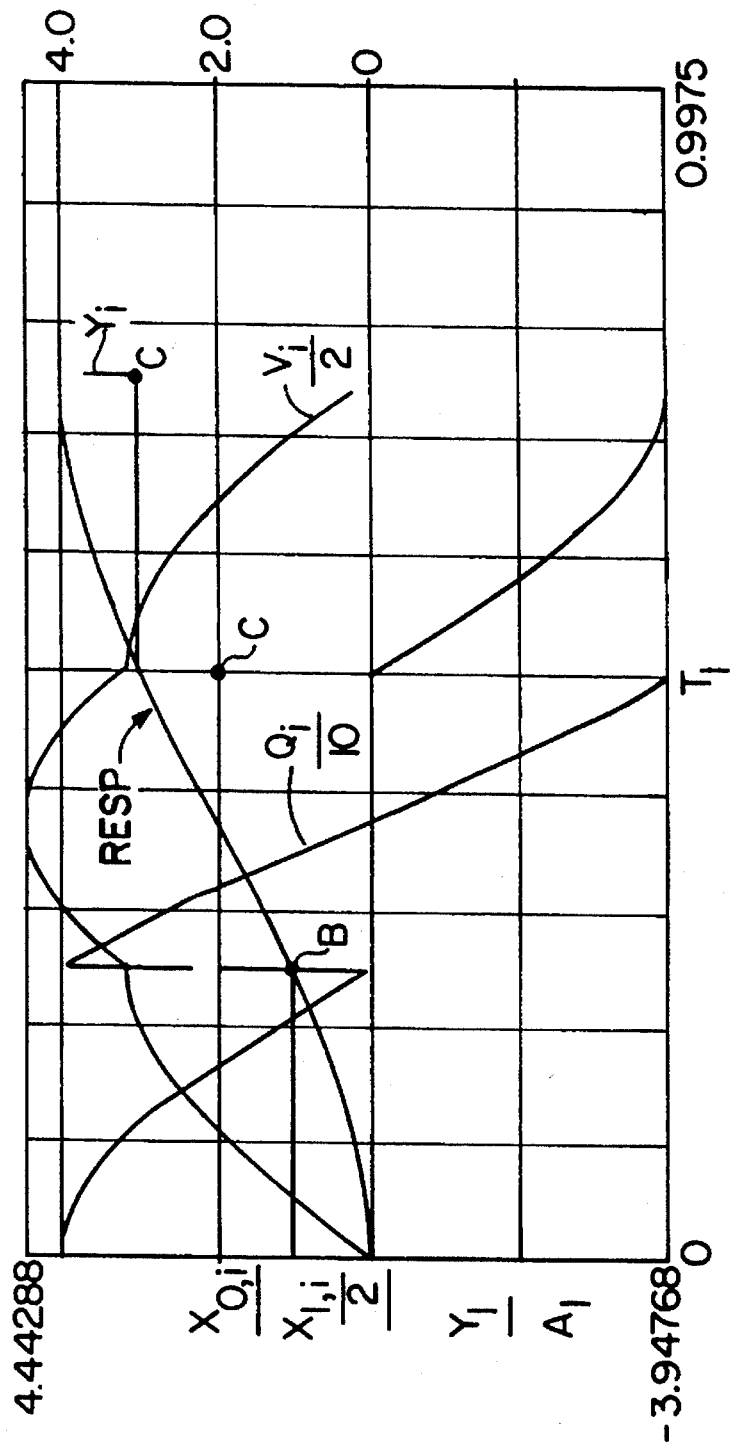
FIG. 16 is a graph showing input-output displacement, velocity and acceleration for the undamped four step method.

While trying to speed up the robot's response, it is found that using multiple steps can cause faster response in less time. A four step case is illustrated in FIG. 16. In this case, steps occur at 0 T, 0.25 T, 0.50 T, and 0.75 T. The maximum velocity is 8.88 A $f_n$ while the maximum acceleration is still 39.4 A $f_n^2$. In this case, the robot has moved 4.0 units of A in 0.75 T seconds.

Figure 17:
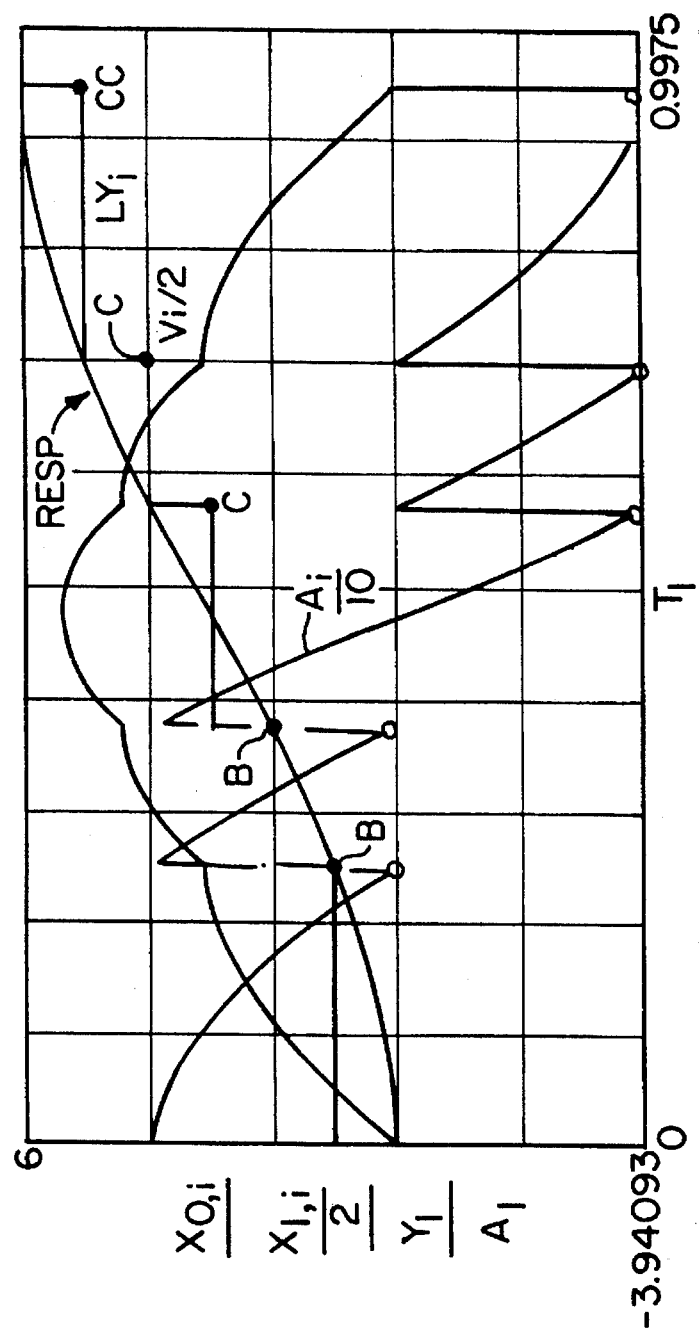
FIG. 17 is a graph showing input-output displacement, velocity and acceleration for the undamped six step method.

The six step method is shown in FIG. 17. In this case the steps occur at 0 T, 0.250 T, 0.375 T, 0.5725 T, 0.70 T, and 0.95 T. The maximum velocity increases to about 11.0 A $f_n$ while the maximum acceleration remains at 39.4 A $f_n^2$. This scheme achieves a maximum displacement of 6.0 A in 0.95 T seconds.

Note that an accelerating step input is applied each time the acceleration goes to zero and the response catches up to the previous input step (such as point B in FIGS. 16 and 17). The decelerating step is applied when the deceleration reaches a maximum and the input catches up to the response (such as points C in FIGS. 15, 16, and 17). It is clear that proper timing will result in the quickest response with no residual vibration.

A figure of merit of each method is to take the maximum vibration free displacement achieved and divide it by the time required. Table 1 gives the results for the 2, 4, and 6 step method. The four step method is seen to have a 33 per cent increase over the two step method while the six step methods has a 58 per cent increase. The problem with using more than four steps is that the timing becomes much more complicated to apply. It is anticipated that eight to ten steps may be a practical upper limit. The four step method is clearly the simplest to implement next to the two step method.

TABLE 1

Figure of Merit in Comparing Rapid Response Schemes.

| Method | Amplitude A | Time T | Amp/Time | Ratio* |
|---|---|---|---|---|
| 2 Step | 2.0 A | 0.5 T | 4.0 A/T | 1.0 |
| 4 Step | 4.0 A | 0.75 T | 5.33 A/T | 1.33 |
| 6 Step | 6.0 A | 0.95 T | 6.32 A/T | 1.58 |

* Based on 2 step as basic response.

We claim:

1. A method of controlling a moving robot arm to minimize vibrations, comprising the steps of:
   determining a maximum step distance the robot arm can move in a single step;
   determining a total task distance the robot arm is required to move to complete a specified task, wherein the total task distance is less than or equal to the maximum step distance;
   applying a series of discrete step inputs of varying magnitudes in a timed sequence to the robot arm, the series comprising:
   applying a first step input of a magnitude corresponding to approximately one-half the total task distance;
   measuring the time it takes the robot arm to move one-half of the total task distance, wherein a measured time and a measure velocity are determined;
   estimating robot arm damping using the measured time and the measured velocity;
   calculating and applying a second step input magnitude and application time and a third step magnitude and application time, wherein the magnitude and application time of both the second and third step inputs are based on the estimated robot damping, and further wherein the third step input magnitude is approximately equal to the magnitude of the first step input less the second step input magnitude.

2. The method of claim 1, wherein the specified task is fixed.

3. The method of claim 1, wherein the specified task is variable.

4. The method of claim 2, wherein the total task distance is included in a predetermined set of instructions for minimizing vibrations of the robot arm.

5. The method of claim 3, wherein the total task distance is estimated by a human operator to correspond to the variable task as perceived by the operator.

6. The method of claim 5, wherein the operator closes a loop in an open loop operator-controlled system in response to the operator's perception.

7. A method of controlling a moving robot and to minimize vibrations, comprising the steps of:
   determining a maximum step distance the robot arm can move in a single step;
   determining a total task distance the robot and is required to move to complete a specified task, wherein the total task distance is greater than the maximum step distance;
   applying a series of discrete step inputs of varying magnitudes in a timed sequence to the robot arm, the series comprising:
   analyzing the total task distance to determine a constant velocity displacement and to estimate a linear rise time;
   applying a first step input of a magnitude resulting in the highest constant velocity, the first step input having a magnitude of the maximum step distance divided by two;
   measuring the time it takes the robot arm to move one-half the maximum step distance;
   measuring the robot arm velocity at one-half the maximum step distance;
   estimating robot arm damping using the measured time and the measured robot arm velocity;
   applying a linear input motion to provide for linear motion of the robot arm based on the actual robot arm velocity at the one-half maximum step distance; and
   calculating and applying a second step input magnitude and application time and a third step magnitude and application time, wherein the magnitude and application time of both the second and third step inputs are based on the estimated robot damping, and further wherein the third step input magnitude is approximately equal to the magnitude of the first step input less the second step input magnitude.

8. The method of claim 7, wherein the specified task is fixed.

9. The method of claim 7, wherein the specified task is variable.

10. The method of claim 8, wherein the total task distance is included in a predetermined set of instructions for minimizing vibrations of the robot arm.

11. The method of claim 9, wherein the total task distance is estimated by a human operator to correspond to the variable task as perceived by the operator.

12. The method of claim 11, wherein the operator closes a loop in an open loop operator-controlled system in response to the operator's perception.

* * * * *

UNITED STATES PATENT AND TRADEMARK OFFICE
CERTIFICATE OF CORRECTION

PATENT NO. : 5,594,309
DATED : January 14, 1997
INVENTOR(S) : Kenneth G. McConnell and Wan-Shik Jang It is certified that error appears in the above-identified patent and that said Letters Patent is hereby corrected as shown below:

Col. 4, line 28, please delete "$\Delta Ax$" and insert --$\Delta x$--;
Col. 9, line 31, delete "$74_2$" and insert -- $\theta_2$--;
Col. 9, line 33, delete "$7.N_2$" and insert --$7.\theta_2$--;
Col. 12, line 18, delete "and to" and insert --arm to--; and
Col. 12, line 22, delete "and is" and insert --arm is--.

Signed and Sealed this

Second Day of December, 1997

BRUCE LEHMAN

*Attest:*

*Attesting Officer*        Commissioner of Patents and Trademarks